United States Patent
Hartley et al.

(10) Patent No.: US 6,493,024 B1
(45) Date of Patent: Dec. 10, 2002

(54) SIGNAL MONITORING APPARATUS

(75) Inventors: Richard Hartley, Theydon Bois (GB); David Thomas Hartley, Huntingdon (GB)

(73) Assignee: Hamlet Video International Limited, Chesham (GB)

(*) Notice: Subject to any disclaimer, the term of this patent is extended or adjusted under 35 U.S.C. 154(b) by 0 days.

(21) Appl. No.: 09/508,477

(22) PCT Filed: Sep. 11, 1998

(86) PCT No.: PCT/GB98/02747

§ 371 (c)(1), (2), (4) Date: Apr. 24, 2000

(87) PCT Pub. No.: WO99/13650

PCT Pub. Date: Mar. 18, 1999

(30) Foreign Application Priority Data

Sep. 11, 1997 (GB) ............................................. 9719219

(51) Int. Cl.⁷ ...................... H04N 17/00; H04N 17/02; G01R 19/00; G01R 23/16; G01R 23/167; G01R 23/165; G01R 13/14
(52) U.S. Cl. ...................... 348/180; 348/184; 348/185; 348/186; 348/177; 348/189; 324/76.11; 324/76.12; 324/76.28; 324/76.29; 324/76.38
(58) Field of Search ................................. 348/180, 184, 348/185, 189, 186, 177; 324/76.11–76.28, 76.29, 76.38

(56) References Cited

U.S. PATENT DOCUMENTS

| | | | | |
|---|---|---|---|---|
| 4,214,269 A | * | 7/1980 | Parker et al. ................ 358/140 |
| 4,388,637 A | * | 6/1983 | Blair ........................... 358/10 |
| 4,417,268 A | * | 11/1983 | LaSota ......................... 358/10 |
| 4,774,570 A | * | 9/1988 | Araki .......................... 358/108 |
| 4,789,950 A | | 12/1988 | Saxe et al. .................. 364/577 |
| 4,928,251 A | | 5/1990 | Marzalek et al. ........... 364/484 |
| 5,117,483 A | | 5/1992 | Latshaw ...................... 395/100 |
| 5,221,967 A | * | 6/1993 | Ward et al. .................. 358/139 |
| 5,298,996 A | * | 3/1994 | Stelling ....................... 348/180 |
| 5,373,327 A | * | 12/1994 | McGee et al. .............. 348/645 |
| 5,432,548 A | * | 7/1995 | Byen et al. .................. 348/180 |
| 5,485,199 A | * | 1/1996 | Elkind et al. ................ 348/180 |
| 5,504,522 A | * | 4/1996 | Setogawa .................... 348/185 |
| 5,519,440 A | * | 5/1996 | Baker .......................... 348/186 |
| 5,734,422 A | | 3/1998 | Maurer et al. ............... 348/184 |
| 5,808,464 A | * | 9/1998 | Natori et al. ................ 324/121 |
| 5,808,671 A | * | 9/1998 | Maycock et al. ............ 348/180 |

FOREIGN PATENT DOCUMENTS

| | | |
|---|---|---|
| DE | 1541379 | 2/1979 |
| EP | 0738089 A1 | 10/1996 |
| GB | 2056825 | 3/1981 |
| GB | 2154401 A | 9/1985 |
| GB | 2291574 A | 1/1996 |

OTHER PUBLICATIONS

"Test and Measurement of Serial Digital Television Signals" by Fibush and Elkind in SMPTE Journal, Sep. 1992, No. 9, pp. 623–631.

* cited by examiner

*Primary Examiner*—John Miller
*Assistant Examiner*—Paulos M. Natnael
(74) *Attorney, Agent, or Firm*—David P. Gordon; David S. Jacobson; Thomas A. Gallagher

(57) ABSTRACT

A digital video signal monitoring apparatus comprises means (2,4,6) for receiving a digital video signal and extracting therefrom a plurality of digital signals, each of which comprises a plurality of successive digital sample values. The apparatus further comprises means (10) for interpolating additional digital values intermediate the successive samples of the or each extracted digital signal and means for displaying the waveform of the or each extracted digital signal as a series of discrete points corresponding to its respective digital sample values and interpolated digital values. Thus, none of the original signal information is lost in displaying a signal waveform having a substantially continuous appearance.

51 Claims, 3 Drawing Sheets

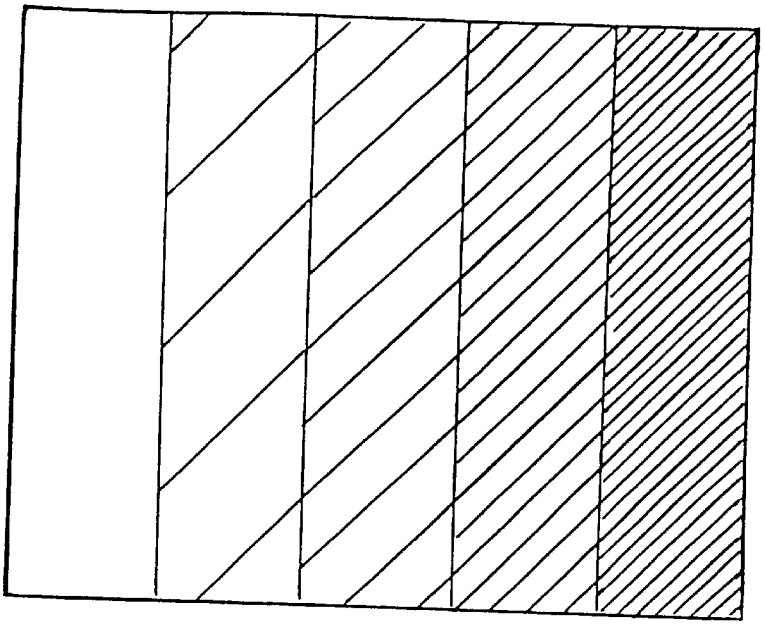
Figure 2
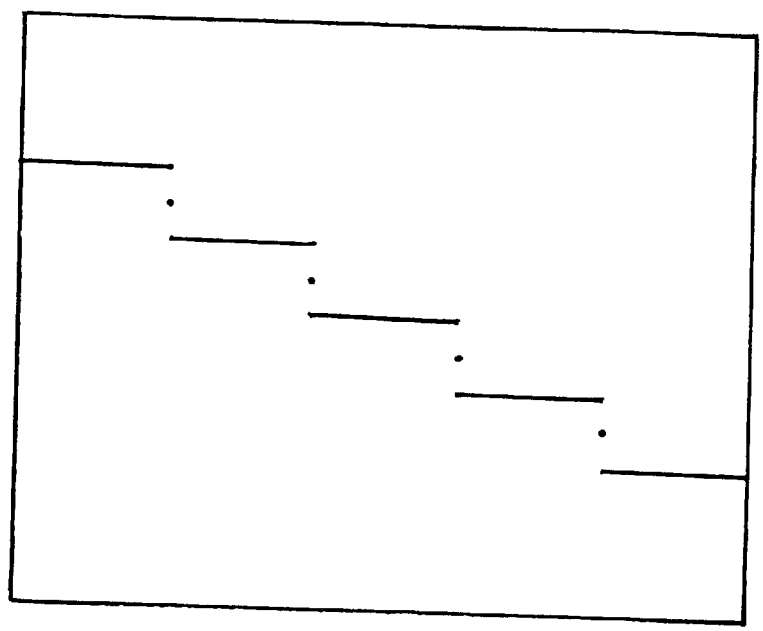
Figure 3  Prior Art

SIGNAL MONITORING APPARATUS

BACKGROUND OF THE INVENTION

1. Field of the Invention
2. State of the Art

The present invention relates to a digital video signal monitoring apparatus.

In order to ensure that a television transmission/reception system is operating satisfactorily, various apparatus have been devised which enable an engineer to monitor a received video signal.

Hitherto, due to limitations in the speed and complexity of available electronic hardware, the majority of transmitted video signal have comprised analogue signals which are typically monitored sing an oscilloscope or vectorscope. More recently, however, a number of systems have been disclosed which allow analogue video signal waveforms to be displayed superimposed over, or 'burnt' into a decoded video image (i.e. the video image is blacked out at the locations of the video signal waveform displays). This arrangement is clearly advantageous, particularly in that the engineer is able to view both the video signal waveform and the video image simultaneously.

Digital broadcast video systems are now commonplace in the television industry with suitable digital technology having been available for some time.

A typical digital video signal comprises a plurality of digital signals, such as luminance, two color difference and an audio signal, multiplexed together.

Each of the signals making up the digital video signal comprises a plurality of successive digital sample values, so that when monitoring those signals it has been necessary either to display their waveforms as a series of discrete points corresponding to their respective sample values, or to low-pass filter the digital signal waveforms so that the resulting analogue signal waveforms may displayed.

Whilst it is often more desirable to display a continuous signal waveform rather than its discrete digital equivalent, the process of converting a signal between the digital and analogue domains leads to inaccuracies in its displayed waveform.

Also, where it necessary to re-digitise an analogue signal, for example to enable the signal waveform to be displayed superimposed over, or 'burnt' into a decoded video image, then the analogue-to-digital/digital-to-analogue conversion processes will tend to introduce unnecessary noise into the signal which may corrupt the decoded video image.

SUMMARY OF THE INVENTION

I have now devised an arrangement which allows digital video signal waveforms to be displayed without the necessity for conversion to an equivalent analogue signal, whilst providing the improved appearance of a continuous analogue waveform display.

In accordance with the present invention, there is provided a digital video signal monitoring apparatus comprising means for receiving a digital video signal comprising a plurality of digital signals which have been multiplexed together, each signal comprising a plurality of successive digital sample values, means for extracting from said digital video signal one or more of said plurality of digital signals, means for interpolating additional digital values intermediate the successive samples of the or each extracted digital signal such that its sample rate is increased, and means for displaying the waveform the or each extracted digital signal as a series of discrete paints corresponding to its respective digital sample values and interpolated digital values.

Thus, the increased resolution of the or each displayed signal waveform gives it a more continuous appearance. However, none of the original signal information is lost or distorted, and so the decoded video image may be displayed without loss of quality.

Preferably, said plurality of digital signals comprises a luminance signal and/or a pair of color difference signals and/or an audio signal.

Preferably said monitoring apparatus comprises means for selecting which of said plurality of digital signals is to have its waveform displayed.

Preferably the waveform of the or each extracted digital signal may be displayed as a linear or vector display. Preferably the monitoring apparatus comprises means for combining the displayed signal waveform with a graticule or other graphical measurement or reference means. Preferably digitally generated horizontal and vertical cursors are provided to allow amplitude and/or timing measurements to be made of a displayed waveform. Preferably the results of said amplitude and/or time measurements are numerically displayed by said display means.

The apparatus may also comprise means for decoding the luminance and color difference signals to obtain corresponding RGB values which may be displayed in the form of a gamut display, and means to identify therefrom the presence of any illegal colors.

Preferably the interpolating means comprises an oversampling digital filter which preferably comprises a transversal FIR (finite impulse response) filter whose coefficients are derived from a $\sin(x)/x$ low-pass impulse response curve. Preferably the transversal filter comprises five filter stages, the degree of asymmetry of whose respective coefficients determines the magnitude of each intermediate digital value.

The intermediate digital values may be interpolated by varying the coefficients of the oversampling digital filter, on a line by line basis, over a complete video field, preferably such that between the first and last lines of the video field, the $\sin(x)/x$ curve from which the coefficients are derived is phase shifted in discrete intervals, between $-180$ degrees and $+180$ degrees. A complete signal waveform may then be obtained by superimposing the filter outputs for each line.

Alternatively, the intermediate digital values may be interpolated by recirculating a single line of the video field through a buffer whilst varying the coefficients of the oversampling filter by phase shifting the $\sin(x)/x$ curve from which the coefficients are derived.

Preferably the or each digital signal waveform is displayed superimposed over, or 'burnt' into, a decoded video image.

Preferably said display means comprises a cathode ray tube (CRT), which may be television or computer type monitor e.g. VGA, SVGA. However said display means may instead comprise a non-CRT devise such as a liquid crystal display (LCD), plasma display or projection system, etc.

The or each digital signal waveform may be displayed directly or may be re-transmitted for display at a remote location.

The apparatus lay further comprise various error detection means for identifying and preferably logging a variety of errors in the received digital video signal, such as clock jitter, missing or invalid synchronisation codes, cyclic redundancy errors, etc. Error messages may be numerically displayed by said display means.

An embodiment of the present invention will now be described by way of example only and with reference to the accompanying with drawings, in which:

BRIEF DESCRIPTION OF THE DRAWINGS

FIG. 2 shows a grey-scale test image;

FIG. 3 shows prior art digital signal waveform display corresponding to the test image of FIG. 1;

DETAILED DESCRIPTION OF THE PREFERRED EMBODIMENT

Figure 1:
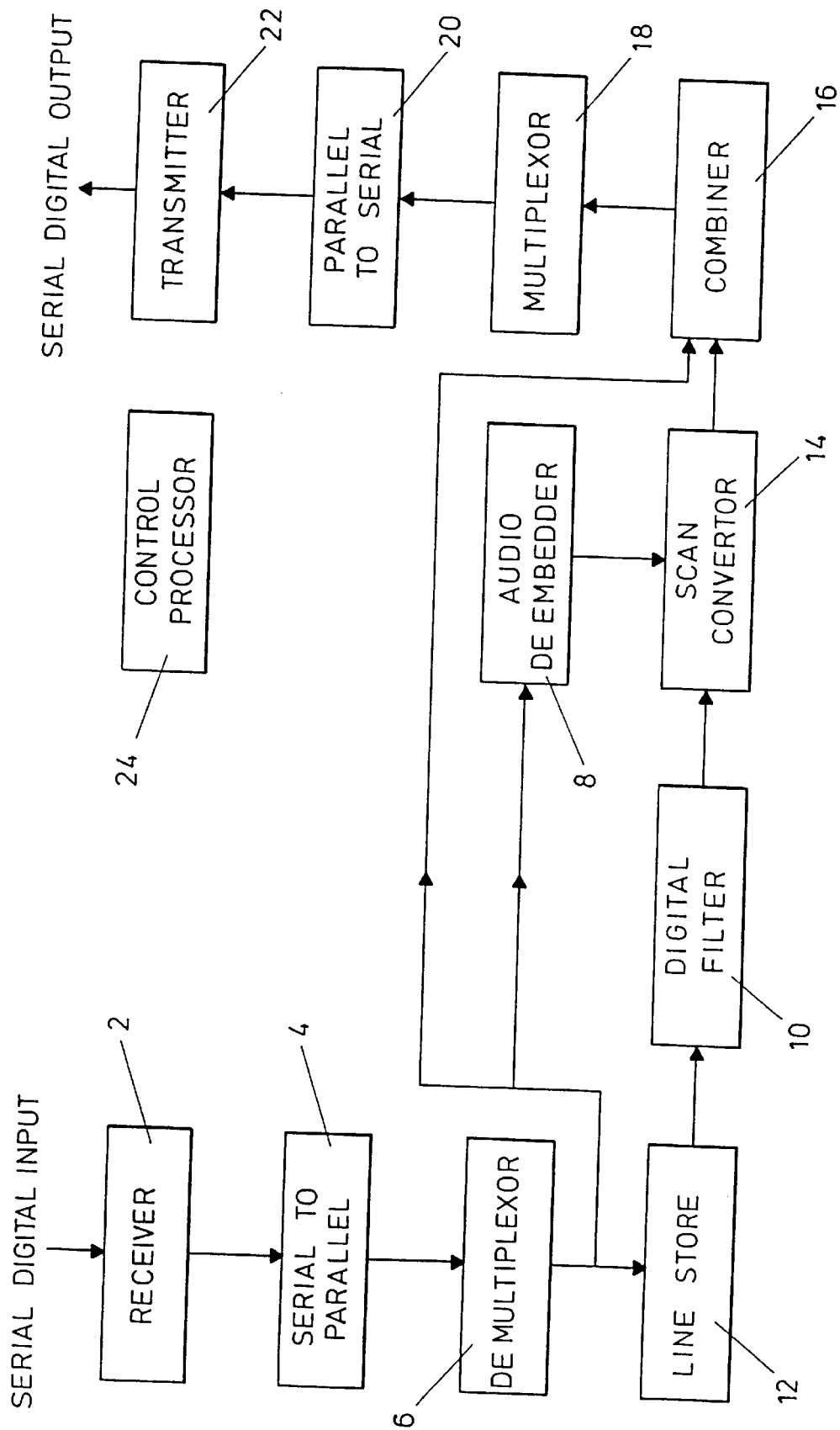
FIG. 1 is a block diagram of a digital video signal monitoring apparatus in accordance with the present invention.

Referring to FIG. 1 of the drawings, a 270 MHz serial digital video input signal is fed via a cable to a receiver 2 comprising an amplitude dependent equaliser for compensating for different cable lengths. A serial to parallel converter 4 then converts the received serial signal into a 10 bit parallel signal of 27 MHz from which a demultiplexer 6 extracts a video luminance signal at 13.5 MHz, a red color difference signal at 6.75 MHz and a blue color difference signal at 6.75 MHz.

Also extracted from the received video signal by an audio de-embedder 8 are sixteen audio channels (eight stereo pairs), encoded as four groups of four channels, which are transmitted in the horizontal blanking regions of the video signal. The apparatus may also comprise inputs for AES/EBU digital audio and analogue audio.

Whichever signal is selected by the test engineer to be monitored is filtered using a transversal FIR digital filter 10 whose coefficients are varied to interpolate additional digital values intermediate those of the input signal samples.

The intermediate digital values may be interpolated by varying the coefficient of the oversampling digital filter, on a line by line basis, over a complete video field, such that between the first and last lines of the video field, the sin(x)/x curve from which the coefficients are derived is phase shifted, in discrete intervals, between −180 degrees and +180 degrees.

Alternatively, a analogue type display may be built up for a single line in the video field by recirculating that line through a buffer 12 whilst varying the coefficients of the oversampling filter by phase shifting the sin(x)/x curve from which the coefficients are derived.

The extracted audio signal or filtered video signal is written into a field store 14 comprising a 512×512×4 bit memory which is addressed according to the required waveform display.

Where a linear display of a digital signal waveform is required, the memory is addressed in a first dimension using an incremental timebase value and in a second dimension using a corresponding digital signal value, the four-bit value stored in each memory location being incremented each time the memory location is addressed. This value is used to set the brightness of the corresponding location in the waveform display.

Where a vector display of the video signal is instead required, the memory is addressed in two dimensions using the respective values of the two color difference signals. similarly, for a vector display of the digital audio waveform, the memory is addressed using the audio difference signals L+R and R+L as first and second dimensions respectively.

When data is read from the memory, its address corresponds, in said first dimension, with a television pixel address and in said second dimension with a television line address.

The memory addresses are synchronised during the read cycle so that the waveform data may be combined with the extracted luminance and color difference signals by a combiner 16, the resulting signals being multiplexed together by a multiplexer 18 and converted to a serial data stream by a parallel to serial converter 20 before being transmitted by transmitter 22 to suitable display means.

A microprocessor 24 performs various system control functions and also provides a means for the processing and analysis of the received video signal.

FIG. 2 shows a typical grey-scale test image comprising a series of vertical stripes varying incrementally in intensity from white on the extreme left of the image to black at the extreme right.

FIG. 3 shows the digital luminance waveform which would be displayed, for example by an oscilloscope, for the test image of FIG. 1. This image comprises a plurality of discrete points corresponding to the magnitudes of respective digital samples of the luminance signal for one line of the test image. As each line of the test image is identical, the same discrete waveform is displayed for each line of the transmitted video field, thus providing a persistent image on the oscilloscope.

The discrete nature of the digital waveform display (greatly exaggerated in FIG. 3) means that it does not clearly convey the true shape of the analogue signal from which the digital values have been derived, particularly where there are abrupt transitions in the displayed waveform. Prior art monitoring apparatus have overcome this problem by low-pass filtering the digital signal waveform so that the resulting analogue signal waveform ay instead be displayed. However, for the reasons mentioned above, this arrangement is not ideal.

Figure 4:
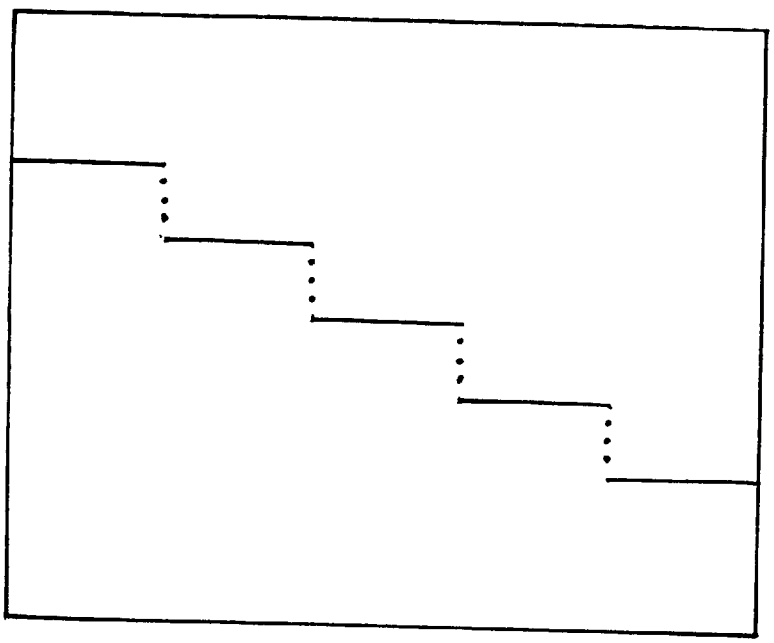
FIG. 4 shows a digital signal waveform display in accordance with the present invention.

FIG. 4 shows the more desirable digital waveform display obtained using the digital video signal monitoring apparatus of the present invention. The resolution of the displayed waveform can be seen to have been increased by combining the displays of both the original digital sample values and the interpolated intermediate digital values. Whilst, in this case, a different set of points are now displayed for each line of the transmitted field, the video frame rate ensures that persistent image of the signal waveform is still maintained.

Figure 5:
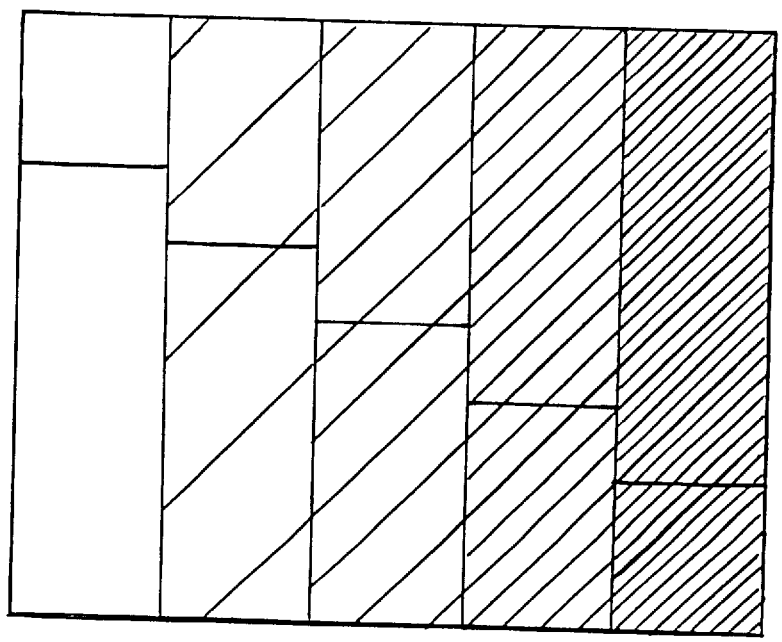
FIG. 5 shows he waveform display of FIG. 4, superimposed over the grey-scale test image of FIG. 1.

FIG. 5 shows how the increased resolution signal waveform display may be superimposed over the test image display to enable the two displays to be viewed simultaneously.

The digital video signal monitoring device thus described provides an improved digital signal waveform display having a continuous analogue appearance but without requiring any digital-to-analogue or corresponding analogue-to-digital conversion processes which might lead to inaccuracies in the display or in the loss or distortion of the digital signal.

What is claimed is:

1. A digital video signal monitoring apparatus comprising:
   means for receiving a digital video signal comprising a plurality of digital signals which have been multiplexed together, each signal comprising a plurality of successive digital sample values;

means for extracting from said digital video signal one of said plurality of digital signals;

an oversampling digital filter for interpolating additional digital values intermediate the successive samples of the extracted digital signal; and means for displaying the waveform of the extracted digital signal as a plurality of waveforms superimposed over one-another, to give the appearance that the waveform has been oversampled, each of said plurality of waveform comprising a series of discrete points corresponding to the digital sample values and interpolated digital values for a line of a video field, the coefficients of the oversampling digital filter being different for each waveform, wherein each of said plurality of waveforms comprises a series of discrete points corresponding to the digital sample values and interpolated digital values for the same line of a video field and said intermediate digital values are interpolated by recirculating said same line through a buffer whilst varying the coefficients of said oversampling digital filter.

2. A digital video signal monitoring apparatus as claimed in claim 1, wherein the brightness or luminance of any discrete point of said displayed waveform common to two or more of said plurality of waveforms corresponds to the number of said displayed waveforms to which that point is common.

3. A digital video signal monitoring apparatus as claimed in claim 1, wherein each of said plurality of waveforms comprises a series of discrete points corresponding to the digital sample values and interpolated digital values for a respective line of a video field, the number of superimposed waveforms being equal to the number of lines in said video field.

4. A digital video signal monitoring apparatus as claimed in claim 1, wherein said oversampling digital filter comprises a transversal FIR filter whose coefficients are derived from a sin(x)/x low-pass impulse response curve.

5. A digital video signal monitoring apparatus as claimed in claim 4, wherein said transversal FIR filter comprises five filter stages, the degree of asymmetry of whose respective coefficients determines the magnitude of each intermediate digital value.

6. A digital video signal monitoring apparatus as claimed in claim 4 wherein each of said plurality of waveforms comprises a series of discrete points corresponding to the digital sample values and interpolated digital values for a respective line of a video field, the number of superimposed waveforms being equal to the number of lines in said video field, wherein, between the first and last lines of said video field, the sin(x)/x curve from which said coefficients are derived is phase shifted, in discrete intervals, between −180 degrees and +180 degrees.

7. A digital video signal monitoring apparatus as claimed in claim 1, wherein the or each digital signal waveform is displayed superimposed over or 'burnt' into a decoded video image.

8. A digital video signal monitoring apparatus as claimed in claim 1, wherein said plurality of digital signals comprises a luminance signal and/or a pair of color difference signals and/or an audio signal.

9. A digital video signal monitoring apparatus as claimed in claim 1, comprising means for selecting which of said plurality of digital signals is to have its waveform displayed.

10. A digital video signal monitoring apparatus as claimed in claim 1, wherein the waveform of the extracted digital signal is displayed as a cartesian display.

11. A digital video signal monitoring apparatus as claimed in claim 1, wherein the waveform of the extracted digital signal is displayed as a vector display.

12. A digital video signal monitoring apparatus as claimed in claim 1, wherein the waveform of the extracted digital signal is displayed in combination with a graticule or other graphical measurement or reference means.

13. A digital video signal monitoring apparatus as claimed in claim 1, comprising means for digitally generating horizontal and vertical cursors to allow amplitude and/or timing measurements to be made of a displayed signal waveform.

14. A digital video signal monitoring apparatus as claimed in claim 5, wherein the results of said amplitude and/or time measurements are numerically displayed by said display means.

15. A digital video signal monitoring apparatus as claimed in claim 1, comprising means for extracting from said digital video signal a luminance signal and a pair of color difference signals and means for decoding said luminance and color difference signals to obtain corresponding RGB values for display in the form of a gamut display.

16. A digital video signal monitoring apparatus as claimed in claim 15, wherein said decoding means comprises means for identifying the presence of any illegal colors.

17. A digital video signal monitoring apparatus as claimed in claim 1, comprising means for re-transmitting the digital signal waveform for display at a remote location.

18. A digital video signal monitoring apparatus as claimed in claim 1, comprising error detection means for identifying errors in said digital video signal.

19. A digital video signal monitoring apparatus comprising:

means for receiving a digital video signal comprising a plurality of digital signals which have been multiplexed together, each signal comprising a plurality of successive digital sample values;

means for extracting from said digital video signal one of said plurality of digital signals;

an oversampling digital filter for interpolating additional digital values intermediate the successive samples of the extracted digital signal; and means for displaying the waveform of the extracted digital signal as a plurality of waveform superimposed over one-another, to give the appearance that the waveform has been oversampled, each of said plurality of waveform comprising a series of discrete points corresponding to the digital sample values and interpolated digital values for a line of a video field, the coefficients of the oversampling digital filter being different for each waveform, wherein said oversampling digital filter comprises a transversal FIR filter whose coefficients are derived from a sin(x)/x low-pass impulse response curve.

20. A digital video signal monitoring apparatus as claimed in claim 19, wherein each of said plurality of waveforms comprises a series of discrete points corresponding to the digital sample values and interpolated digital values for the same line of a video field.

21. A digital video signal monitoring apparatus as claimed in claim 20, wherein the brightness or luminance of any discrete point of said displayed waveform common to two or more of said plurality of waveforms corresponds to the number of said displayed waveforms to which that point is common.

22. A digital video signal monitoring apparatus as claimed in claim 19, wherein each of said plurality of waveforms comprises a series of discrete points corresponding to the digital sample values and interpolated digital values for a respective line of a video field, the number of superimposed waveforms being equal to the number of lines in said video field.

23. A digital video signal monitoring apparatus as claimed in claim 19, wherein said transversal FIR filter comprises five filter stages, the degree of asymmetry of whose respective coefficients determines the magnitude of each intermediate digital value.

24. A digital video signal monitoring apparatus as claimed in claim 19, wherein each of said plurality of waveforms comprises a series of discrete points corresponding to the digital sample values and interpolated digital values for a respective line of a video field, the number of superimposed waveforms being equal to the number of lines in said video field, wherein, between the first and last lines of said video field, the sin(x)/x curve from which said coefficients are derived is phase shifted, in discrete intervals, between −180 degrees and +180 degrees.

25. A digital video signal monitoring apparatus as claimed in claim 19, wherein the or each digital signal waveform is displayed superimposed over or 'burnt' into a decoded video image.

26. A digital video signal monitoring apparatus as claimed in claim 19, wherein said plurality of digital signals comprises a luminance signal and/or a pair of color difference signals and/or an audio signal.

27. A digital video signal monitoring apparatus as claimed in claim 19, comprising means for selecting which of said plurality of digital signals is to have its waveform displayed.

28. A digital video signal monitoring apparatus as claimed in claim 19, wherein the waveform of the extracted digital signal is displayed as a cartesian display.

29. A digital video signal monitoring apparatus as claimed in claim 19, wherein the waveform of the extracted digital signal is displayed as a vector display.

30. A digital video signal monitoring apparatus as claimed in claim 19, wherein the waveform of the extracted digital signal is displayed in combination with a graticule or other graphical measurement or reference means.

31. A digital video signal monitoring apparatus as claimed in claim 19, comprising means for digitally generating horizontal and vertical cursors to allow amplitude and/or timing measurements to be made of a displayed signal waveform.

32. A digital video signal monitoring apparatus as claimed in claim 23, wherein the results of said amplitude and/or time measurements are numerically displayed by said display means.

33. A digital video signal monitoring apparatus as claimed in claim 19, comprising means for extracting from said digital video signal a luminance signal and a pair of color difference signals and means for decoding said luminance and color difference signals to obtain corresponding RGB value for display in the form of a gamut display.

34. A digital video signal monitoring apparatus as claimed in claim 33, wherein said decoding means comprises means for identifying the presence of any illegal colors.

35. A digital video signal monitoring apparatus as claimed in claim 19, comprising means for re-transmitting the digital signal waveform for display at a remote location.

36. A digital video signal monitoring apparatus as claimed in claim 19, comprising error detection means for identifying errors in said digital video signal.

37. A digital video signal monitoring apparatus comprising:

means for receiving a digital video signal comprising a plurality of digital signals which have been multiplexed together, each signal comprising a plurality of successive digital sample values;

means for extracting from said digital video signal one of said plurality of digital signals;

an oversampling digital filter for interpolating additional digital values intermediate the successive samples of the extracted digital signal;

means for displaying the waveform of the extracted digital signal as a plurality of waveforms superimposed over one another, to give the appearance that the waveform has been oversampled, each of said plurality of waveform comprising a series of discrete points corresponding to the digital sample values and interpolated digital values for a line of a video field, the coefficients of the oversampling digital filter being different for each waveform; and means for digitally generating horizontal and vertical cursors to allow amplitude and/or timing measurements to be made of a displayed signal waveform.

38. A digital video signal monitoring apparatus as claimed in claim 37, wherein each of said plurality of waveforms comprises a series of discrete points corresponding to the digital sample values and interpolated digital values for the same line of a video field.

39. A digital video signal monitoring apparatus as claimed in claim 38, wherein the brightness or luminance of any discrete point of said displayed waveform common to two or more of said plurality of waveforms corresponds to the number of said displayed waveforms to which that point is common.

40. A digital video signal monitoring apparatus as claimed in claim 37, wherein each of said plurality of waveforms comprises a series of discrete points corresponding to the digital sample values and interpolated digital values for a respective line of a video field, the number of superimposed waveforms being equal to the number of lines in said video field.

41. A digital video signal monitoring apparatus as claimed in claim 37, wherein the or each digital signal waveform is displayed superimposed over or 'burnt' into a decoded video image.

42. A digital video signal monitoring apparatus as claimed in claim 37, wherein said plurality of digital signals comprises a luminance signal and/or a pair of color difference signals and/or an audio signal.

43. A digital video signal monitoring apparatus as claimed in claim 37, comprising means for selecting which of said plurality of digital signals is to have its waveform displayed.

44. A digital video signal monitoring apparatus as claimed in claim 37, wherein the waveform of the extracted digital signal is displayed as a Cartesian display.

45. A digital video signal monitoring apparatus as claimed in claim 37, wherein the waveform of the extracted digital signal is displayed as a vector display.

46. A digital video signal monitoring apparatus as claimed in claim 37, wherein the waveform of the extracted digital signal is displayed in combination with a graticule or other graphical measurement or reference means.

47. A digital video signal monitoring apparatus as claimed in claim 37, comprising means for digitally generating horizontal and vertical cursors to allow amplitude and/or timing measurements to be made of a displayed signal waveform.

48. A digital video signal monitoring apparatus as claimed in claim 37, comprising means for extracting from said digital video signal a luminance signal and a pair of color difference signals and means for decoding said luminance and color difference signals to obtain corresponding RGB values for display in the form of a gamut display.

49. A digital video signal monitoring apparatus as claimed in claim 48, wherein said decoding means comprises means for identifying the presence of any illegal colors.

50. A digital video signal monitoring apparatus as claimed in claim 37, comprising means for re-transmitting the digital signal waveform for display at a remote location.

51. A digital video signal monitoring apparatus as claimed in claim 37, comprising error detection means for identifying errors in said digital video signal.

* * * * *